3,443,990
COLD-WATER-DISPERSIBLE STARCH PRODUCT
Coenraad Decnop, Bussum, Netherlands, assignor to Amylo Chemie N.V., Koog aan de Zaan, Netherlands, a Dutch company
No Drawing. Filed Sept. 2, 1965, Ser. No. 484,735
Claims priority, application Netherlands, Sept. 7, 1964, 6410374
Int. Cl. C13l 1/08
U.S. Cl. 127—33                            17 Claims

ABSTRACT OF THE DISCLOSURE

A cold-water-dispersible starch product is made by intimately mixing an aqueous suspension of a starch material with an effective amount up to 4% of an antiagglomeration and antidegradation additive consisting essentially of a finely divided mono- or diglyceride of a saturated higher fatty acid (e.g. glycerol mono- or distearate), and then subjecting the mixture to a normal heat treatment for causing gelatinization and drying of the starch. Said starch material may have a special addition of carboxymethyl cellulose or natural gums while said glyceride additive may include up to 3% by weight of triglycerides. The resulting end product evidences no lump formation on addition with water and no undesired gel formation or retrogradation on aging and cooling of pastes made therefrom.

---

This invention relates to a cold-water-dispersible starch product and to a process of producing the same.

Cold-water dispersible starch products are used today on a wide scale as laundry starches, thickeners for printing pastes, and as main constituents of dry pudding and other edible compositions. They are generally produced by subjecting an aqueous suspension of starch or starch-containing flour or a conversion product thereof to a heating process with simultaneous removal of water, e.g. by passing the starch suspension between heated rolls of a roller drier of by spray-drying the heated suspension into a drying chamber. Subsequent grinding of the gelatinized and dried material results in a product that is readily dispersible in cold water or an aqueous liquid.

A disadvantage commonly inherent in earlier cold-water-dispersible starch products, especially when they have been ground to a very fine particle size, is the formation of lumps on addition of water. These lumps cannot easily be disintegrated and therefore will not form a homogeneous paste with water as is necessary for most applications.

A further disadvantage often inherent in cold-water-dispersible starch products of prior kinds resides in that pastes made from these products by admixture with water have a tendency to set rapidly to strong gels even when they were thoroughly dispersed initially.

A third disadvantage of prior art cold-water-dispersible starch products is that pastes made from these products and water often have a tendency to undergo retrogradation (or degradation) after aging at room temperature or lower temperatures. A part of the starch will aggregate progressively and finally form an insoluble microcrystalline precipitate.

Some proposals have already been made to prevent the lumps formation of cold-water-dispersible starch products. Thus it is quite usual to incorporate relatively large amounts of finely divided salts or sugar and the like in the cold-water-dispersible starch product.

According to a proposal made by Hinz et al. in U.S. Patent No. 2,554,143, the lump formation of a cold-water-dispersible pudding starch can be overcome by mixing this finely divided cold-water-dispersible starch with a hydrophobic substance which coats the starch particle just sufficiently to prevent too rapid hydration. Examples of such hydrophobic substances are talc, chalk, oils, fats and waxes.

Although some additives may be useful in preventing lump formation, they do not prevent the undesired gel formation or retrogradation of pastes made from the mixture.

It is an object of the invention to provide a cold-water-dispersible starch product that will evidence substantially no lump formation on addition of water or an aqueous liquid and substantially no undesired gel formation and retrogradation on aging and cooling of pastes made therefrom.

It is a further object of the invention to provide a water-dispersible starch product that will yield stabilized emulsions with water and oils or fats without need of a special emulsifying agent.

Moreover, it is an object of the invention to provide a process of producing a water-dispersible product of this character.

A still further object of the invention is to provide a process for producing a water-dispersible starch product that will need no special emulsifier to give stable emulsions with water and fats or oils.

It has now surprisingly been found, that a cold-water-dispersible starch product substantially free from the aforementioned disadvantages of the prior art can be produced when an effective proportion of a finely divided monoglyceride and/or diglyceride of a saturated higher fatty acid, e.g. glycerol mono or distearate, is intimately mixed with the starch ingredient prior to heating and drying. There results a physico-chemical reaction between the two main ingredients at the temperature of the heating and drying treatment to yield a gelatinized reaction product that evidences no lump formation on addition with water and manifests no undesired gel formation or retrogradation on aging and cooling of pastes made therefrom.

Although the following discussion is not meant to restrict the invention, it is believed that the reactions taking place during the heat treatment of the aqueous mono- or diglyceride molecule (or at least of its aliphatic chain) into the helix of the amylose molecules of the starch ingredient. The resulting dry reaction product according to the invention will be hydrophobic so that hydration on addition of water will take place only slowly and no formation of lumps will occur. Besides, the reaction between the amylose helix and the mono- or diglyceride appears to prevent an intramolecular cross-linking of the amylose molecules by hydrogen bonds and gives rise to the substantial absence of undesired gel formation and retrogradation of water pastes made from the product of the invention.

By virtue of these properties, the product of the invention is very suitable for application as an instant laundry starch, an instant thickener for printing pastes and in instant food products such as dry pudding compositions and the like.

A further important advantage of the product of the invention is that its pastes in cold or hot water will give directly a stable emulsion with fats without the need for any special addition of emulsifying agent. This property is important for applications in instant sauces such as a salad sauce or potato-chip sauce and in instant crust pastes.

One ingredient in producing the cold-water-dispersible starch product of the invention is a starch material such as native starch, a starch-containing flour or a non-gelatinized conversion product thereof. Any native starch can be used and examples thereof are corn starch, rice starch, potato starch or tapioca starch. Another source is the starch-containing flours such as wheat flour, rye flour or buckwheat flour, ground cassava roots or manioc roots. Conversion products of starch or flour may also be used provided that they have the practically non-broken, non-gelatinized granular structure of the native starch or starch-containing flour. Examples of such conversion products are thin-boiling starch, dextrine and etherified, esterified and oxidized starches.

The starch component as used in the production process may also comprise additions of carboxymethylcellulose or natural nonresinous gums of vegetable origin, in proportions up to 5% by weight of the dry starch material.

In the process of the invention the starch material is always used in the form of an aqueous suspension containing up to 40% solids.

The mono- and diglycerides chosen for incorporation in the product of the invention may be every mono- and diglyceride of any single higher fatty acid, although glycerol mono and distearate are preferred. An ingredient that has proved to be very suitable for the purposes of the invention is a commercial mixture comprising about 90% of glycerol monostearate and about 10% of glycerol distearate. It has appeared that monoglycerides show the best results and that diglycerides perform somewhat less well than monoglycerides, perhaps as a consequence of steric hindrance. Triglycerides alone will not give any result but mixtures of mono- and triglycerides are very well suited for the invention so that the invention also comprises an addition of one or more triglycerides to the mono- or diglycerides as used in the present process.

The amount of glycerides to be used may vary within a relatively wide range dependent upon the desired application of the end product. In general the mono- and diglycerides will be used in any effective amount up to 4% by weight of the starch material and the triglycerides will be used in an amount of up to 3% by weight of the starch material used as an ingredient in the initial mixture.

In order to obtain good results, it is advisable that the glycerides are already in a finely-divided state prior to mixing with the starch suspension. The preferred particle size is below 0.5 micron. Such a finely divided state can be obtained by emulsifying the glycerides in water. Certain combinations are very useful in this respect. For example, glycerol monostearate is not readily emulsifying in itself but when an emulsion of this compound in water has been obtained, the resulting emulsion is capable of being mixed with relatively large amounts of triglycerides without losing the homogeneity of the emulsion since the monostearate is effective as an emulsifier of these triglycerides. A very advantageous emulsion therefore comprises from 0.1 to 20% by weight of the triglyceride component, from about 0.1 to about 20% by weight of glycerol mono- and/or distearate and from about 60 to about 90% by weight of water.

Further, it is advisable that the aqueous starch suspension and the glyceride additive be intimately mixed with each other in order to ensure a rapid and homogeneous reaction during the heat treatment. This mixing step may e.g. be accomplished by bringing together the starch suspension and glyceride emulsion and intensively agitating the combined ingredients for some time. In most cases, half an hour of agitating will suffice to obtain good results. Grinding both ingredients together in a mill may also lead to the intimate mixture as desired.

After the mixing step, the suspension as obtained is subjected to a heat treatment with simultaneous removal of water. This step can be carried out in any way suitable for starch suspension. Thus, the suspension may be passed in thin layers over the rollers of a roller drier, heated to a temperature above the gelatinization point of the starch. Another method comprises heating the suspension and spray-drying it into a drying chamber. The resulting product is a cold-water-dispersible dry starch product that may be ready for use as such or optionally may be ground to the desired particle size.

The product of the invention will readily disperse in cold water without substantial formation of lumps, even at very high grades of particles fineness. When it is to be introduced into hot water, or milk, the formation of lumps can completely be prevented by admixing with it a minor amount of finely ground sugars prior to use.

Of course, such finely divided sugar can always be incorporated in the end product if it is not objectionable in the final application of the product. It can then be incorporated in proportions between 0.1 and 100% by weight of the sugar-free product without destroying the cold-water-dispersible properties of the starch product.

Further, pastes made from the product of the invention by mixing with water will show substantially no undesired gel formation and substantially no retrogradation on aging and cooling. The gel formation is totally prevented when corn starch is used as the starch component.

The product of the invention and its method of preparation are illustrated in the following examples.

Example I

A glyceride emulsion is prepared by dissolving 80 kilograms of a distilled mixture of glycerol mono- and distearates (containing about 90% of monostearate) in 700 liters of tap water and agitating the mixture as obtained for about 6 hours. After microscopic examination of the emulsion, the whole is completed with water to give a volume of 1100 liters.

On the other hand, a starch suspension is prepared by introducing 900 kilograms of corn starch (containing 12% moisture) into 1250 liters of water and adjusting the concentration of the suspension to a value of 20° Baumé by addition of water.

Thereafter, 85 liters of the glyceride emulsion are added to the thoroughly agitated starch suspension and agitation is continued for one hour. The glyceride-starch suspension as obtained is then passed over steam-heated rolls of a roller drier in order to gelatinize the starch, to promote the reaction and to dry the suspension.

The dry product emerging from the rolls is ground to the desired particle size, viz 200 mesh. This results the end product which has a neutral taste and does not manifest lump formation on addition of water. Gel formation and retrogradation on aging and cooling of pastes made from this product are practically absent.

Example II

The process of Example I is repeated but 900 kilograms of rice flour are used instead of the same quantity of corn starch. The characteristics of the end product with regard to lump formation, gel formation and retrogradation are excellent.

Example III

A glyceride emulsion is prepared by dissolving 80 kilograms of a distilled mixture of glycerol mono- and distearate (containing about 90% of monostearate) in 700 liters of tap water and stirring the mixture as obtained for about 6 hours. After microscopic examination of the emulsion, the whole is completed with water to give a volume of 1100 liters.

320 kilograms of arachis oil are heated to about 50° C. and added to the stirred glyceride emulsion. Stirring is continued for some time till the oil has been properly emulsified. Thereafter, the mixture is cooled to give a stable emulsion.

A starch suspension is prepared by introducing 900 kilograms of rice flour into 1250 liters of water and adjusting the concentration of the suspension to a value of 20° Baumé by addition of water.

Thereafter, 85 liters of the combined glycerides emulsion are added to the thoroughly stirred starch suspension and stirring is continued for one hour. The glyceride-starch suspension as obtained is then passed over steam-heated rolls of a roller drier in order to gelatinize the starch, to cause the reaction to take place and to dry the suspension.

The dry product emerging from the rolls is ground to a particle size of 200 mesh. This results in the end product which has excellent qualities with regard to lump formation, gel formation and retrogradation.

Example IV

The process of Example III is repeated with the difference that corn seed oil is used in place of the equivalent quantity of arachis oil. The results are comparable.

Example V

The process of Example I is repeated but 13.5 kilograms of carboxymethylcellulose are added to the starch suspension prior to mixing with the glyceride emulsion. The end product shows excellent results with regard to absence of lump formation, gel formation and retrogradation.

Example VI

The process of Example I is repeated but 13.5 kilograms of guar are added to the starch suspension prior to mixing with the glyceride emulsion. The results are comparable with those of Example V.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What I claim is:

1. A cold-water-dispersible starch product, consisting essentially of a physico-chemical reaction product of a dry gelatinized starch material selected from the group consisting of gelatinized starch, gelatinized starch containing flour and gelatinized conversion products of starch and starch-containing flour, with up to 4%, by weight of said starch material, of a glyceride material selected from the group consisting of mono- and diglycerides of a saturated higher fatty acid.

2. The product of claim 1, wherein said glyceride material is selected from the group consisting of glycerol mono- and distearates.

3. A cold-water-dispersible starch product, consisting essentially of a physico-chemical reaction product of a dry gelatinized material selected from the group consisting of gelatinized starch, gelatinized starch-containing flour and gelatinized conversion products of starch and starch-containing flour, with up to 4%, by weight of said starch material of a first glyceride material selected from the group consisting of mono- and diglycerides of a saturated higher fatty acid, and with up to 3%, by weight of said starch material, of a second glyceride material consisting essentially of triglycerides.

4. A cold-water-dispersible starch product, consisting essentially of a physico-chemical reaction product of a dry gelatinized material selected from the group consisting of gelatinized starch, gelatinized starch-containing flour and gelatinized conversion products of starch and starch-containing flour, with up to 4%, by weight of said starch material, of a first glyceride material selected from the group consisting of mono- and diglycerides of a saturated higher fatty acid, and with up to 3%, by weight of said starch material, of a second glyceride material consisting essentially of triglycerides, said first glyceride material being selected from the group consisting of glycerol mono- and distearates.

5. The product of claim 4, wherein said first glyceride material comprises about 90% of glycerol monostearate and about 10% of glycerol distearate.

6. A cold-water-dispersible starch product consisting essentially of a physico-chemical reaction product of a dry gelatinized starch material selected from the group consisting of gelatinized starch, gelatinized starch-containing flour and gelatinized conversion products of starch and starch-containing flour, with up to 4%, by weight of said starch materials of a glyceride material selected from the group consisting of mono- and diglycerides of a saturated higher fatty acid, and further comprising up to 5%, by weight of said starch material, of an agent selected from the group consisting of carboxymethylcellulose and natural non-resinous vegetable gums.

7. The product of claim 6, wherein said glyceride material is selected from the group consisting of glycerol mono- and distearate.

8. The product of claim 6, wherein said glyceride material comprises about 90% of glycerol monostearate and about 10% of glycerol distearate.

9. A process for the production of a cold-water-dispersible starch product, which comprises intimately mixing an aqueous suspension of a starch material selected from the group consisting of native starch, starch-containing flour and non-gelatinized conversion products of starch and starch-containing flour, with up to 4%, by weight of said starch material on a solids basis, of a finely divided glyceride material selected from the group consisting of mono- and diglycerides of a saturated higher fatty acid, and subjecting the resulting mixture to a heat treatment with simultaneous removal of water, so as to obtain a dry gelatinized reaction product.

10. The process of claim 9, wherein said glyceride material is selected from the group consisting of glycerol mono- and distearates.

11. A process for the production of a cold-water-dispersible starch product, which comprises intimately mixing an aqueous suspension of a starch material selected from the group consisting of native starch, starch-containing flour and non-gelatinized conversion products of starch and starch-containing flour, with up to 4%, by weight of said starch material on a solids basis, of a finely divided first glycerine material selected from the group consisting of mono- and diglycerides of a saturated higher fatty acid, and with up to 3% by weight of said starch material on a solids basis, of a finely divided second glyceride material consisting essentially of triglycerides, and subjecting the resulting mixture to a heat treatment with simultaneous removal of water so as to obtain a dry gelatinized reaction product.

12. The process of claim 11, wherein the first glyceride material is selected from the group consisting of glycerol mono- and distearates.

13. The process of claim 11, wherein the first glyceride material comprises about 90% of glycerol monostearate and about 10% of glycerol distearate.

14. A process for producing a water-dispersible starch product, comprising intimately mixing an aqueous suspension of a starch material selected from the group consisting of native starch, starch-containing flour and non-gelatinized conversion products of starch and starch-containing flour, with up to 7%, by weight of the starch material on a solids basis of an emulsion comprising from 0.1 to 20% by weight of a first glyceride material selected from the group consisting of mono- and diglycerides of a saturated higher fatty acid, from 0.1 to 20% by weight of a second glyceride material consisting essentially of triglycerides and from 60 to 99% by weight of water, and subjecting the resulting mixture to a heat treatment with simultaneous removal of water, so as to obtain a dry gelatinized reaction product.

15. A process for producing a cold-water-dispersible starch product comprising intimately mixing an aqueous suspension of a starch material selected from the group consisting of native starch, starch-containing flour and conversion products of starch and starch-containing flour, with up to 4%, by weight of the starch material on a solids base, of a finely divided glyceride material selected from the group consisting of mono- and diglycerides of a saturated higher fatty acid, and with up to 5%, by weight of the starch material on a solids basis, of an agent selected from the group consisting of carboxymethylcellulose and natural, non-resinuous vegetable gums, and subjecting the resulting mixture to a heat treatment with simultaneous removal of water so as to obtain a dry gelatinized reaction product.

16. The process of claim 15, wherein the glyceride material is selected from the group consisting of glycerol mono- and distearates.

17. The process of claim 15, wherein the glyceride material comprises about 90% of glycerol monostearate and about 10% of glycerol distearate.

References Cited

UNITED STATES PATENTS

| | | | |
|---|---|---|---|
| 2,913,342 | 11/1959 | Cameron et al. | 99—139 |
| 2,913,359 | 11/1959 | Pollock et al. | 127—33 X |

MORRIS O. WOLK, *Primary Examiner.*

S. MARANTZ, *Assistant Examiner.*

U.S. Cl. X.R.

99—139; 106—211; 127—32, 70; 260—233.3